United States Patent [19]

Wieres

[11] Patent Number: 5,782,402
[45] Date of Patent: Jul. 21, 1998

[54] METHOD FOR PRODUCING A METAL STRUCTURE AND APPARATUS FOR METALLIC JOINING OF SHEET-METAL LAYERS OF A METAL STRUCTURE

[75] Inventor: Ludwig Wieres, Overath, Germany

[73] Assignee: Emitec Gesellschaft fuer Emissionstechnologie mbH, Lohmar, Germany

[21] Appl. No.: 818,309

[22] Filed: Mar. 14, 1997

Related U.S. Application Data

[63] Continuation of PCT/EP95/03563, Sep. 11, 1995.

[30] Foreign Application Priority Data

Sep. 14, 1994 [DE] Germany ............ 44 32 730.7

[51] Int. Cl.$^6$ ............... B23K 1/00; F01N 3/28
[52] U.S. Cl. ............... 228/221; 228/181
[58] Field of Search ............... 228/181, 190, 228/205, 221, 231, 232

[56] References Cited

U.S. PATENT DOCUMENTS

| | | | |
|---|---|---|---|
| 4,166,563 | 9/1979 | Peyraud et al. | 228/221 |
| 4,300,272 | 11/1981 | Hafner et al. | 228/221 |
| 4,709,844 | 12/1987 | Sekiguchi et al. | 228/221 |
| 5,273,204 | 12/1993 | Dalal et al. | 228/231 |
| 5,657,923 | 8/1997 | Sheller | 228/181 |

*Primary Examiner*—Samuel M. Heinrich
*Attorney, Agent, or Firm*—Herbert L. Lerner; Laurence A. Greenberg

[57] ABSTRACT

A method for producing a metal structure, in particular a honeycomb body, especially for a catalytic converter, from at least partly structured, wound, intertwined or stacked sheet-metal layers, includes cleaning the structure in a vacuum in a cleaning chamber, transferring the structure to a process chamber, carrying out a connecting process which may be a brazing operation, transferring the structure to a cooling chamber, and cooling the structure to a predetermined temperature in a vacuum in the cooling chamber. The method is preferably carried out in a three-chamber apparatus and enables shorter production cycles, more economical use of energy, and favorable variation of the surface properties of honeycomb bodies, as compared with previous methods.

18 Claims, 2 Drawing Sheets

METHOD FOR PRODUCING A METAL STRUCTURE AND APPARATUS FOR METALLIC JOINING OF SHEET-METAL LAYERS OF A METAL STRUCTURE

CROSS-REFERENCE TO RELATED APPLICATION

This application is a Continuation of International application Ser. No. PCT/EP95/03563, filed Sep. 11, 1995.

BACKGROUND OF THE INVENTION

FIELD OF THE INVENTION

The invention relates to a method for producing a metal structure, in particular a honeycomb body, especially for a catalytic converter, preferably a catalytic converter for exhaust gases of an internal combustion engine, from at least partly structured, wound, intertwined or stacked sheet-metal layers. The invention also relates to an apparatus for metallic joining of sheet-metal layers of a metal structure.

Metal structures, especially honeycomb bodies, including smooth and structured sheet-metal layers are known, for instance, from German Published, Non-Prosecuted Patent Application DE 29 24 592 A1, corresponding to U.S. Pat. No. 4,381,590, and German Patent DE 36 34 235 C2, corresponding to U.S. Pat. No. 04,847,966. Smooth and corrugated metal sheets are stacked alternatingly on one another in layers therein.

At least some of the individual sheet-metal layers are brazed to one another. It is known from German Published, Non-Prosecuted Patent Application DE 29 24 592 A1, corresponding to U.S. Pat. No. 4,381,590, to produce a honeycomb body by winding one smooth and one corrugated metal strip onto one another to make a plurality of layers. Brazing material is applied between the layers that are wound onto one another, both in strip form and continuously over the smooth strip by an applicator provided with rollers, or is applied to the outermost protuberances of the corrugated strip, which is then placed in a furnace for melting.

Other brazing application methods for such honeycomb bodies are described in detail in Published International Patent Application WO 89/11938, corresponding to U.S. applications Ser. Nos. 08/054,161, filed Apr. 26, 1993 and 08/467,591, filed Jun. 6, 1995. All of the brazing application methods in the prior art are followed by a brazing process in a brazing furnace. Such a brazing process is typically carried out in a vacuum. Heretofore, because of the time involved (six hours, for instance) for generating the vacuum and for heating, very long production cycles were involved, and only a small throughput could be attained.

German Published, Non-Prosecuted Patent Application DE 29 47 694 A1, corresponding to UK Patent Application GB 2,066,692, discloses a method for producing a metal structure, in particular a honeycomb body of a catalytic converter, that is used for cleaning the exhaust gas of internal combustion engines and includes a wound metal strip. The corrugated metal strip is joined at its surfaces that touch the smooth metal strip, and optionally also to an enclosure part that encompasses the two metal strips, by sintering to make a structural unit. The sintering is carried out in a single method step, in which a heat treatment is performed having a temperature that is below the melting point of the material having the metal structure. Thermal post-treatment in an additional method step, such as the heated release of tension, is unnecessary.

SUMMARY OF THE INVENTION

It is accordingly an object of the invention to provide a method for producing a metal structure and an apparatus for metallic joining of sheet-metal layers of a metal structure, which overcome the hereinafore-mentioned disadvantages of the heretofore-known methods and devices of this general type and in which the throughput in joining metal structures, especially honeycomb bodies, is increased. Moreover, the method should be more favorable from an energy standpoint than formerly known kinds of methods. Furthermore, the surface properties of the structure should be favorably varied for the sake of later being coated with ceramic washcoat and catalytically active material.

With the foregoing and other objects in view there is provided, in accordance with the invention, a method for producing a metal structure, in particular a honeycomb body, in particular for a catalytic converter, from at least partly structured, wound, intertwined or stacked sheet-metal layers, which comprises cleaning a structure having sheet-metal layers in a vacuum in a cleaning chamber; transferring the structure to a process chamber; carrying out a process for metallic joining of the sheet-metal layers in a vacuum, with or without additives; transferring the structure to a cooling chamber; and cooling the structure to a predetermined temperature in a vacuum in the cooling chamber.

Advantageous further features are the subject of the dependent claims.

The method of the invention is distinguished in that the structure is first cleaned in a vacuum in a cleaning chamber. Many contaminants on the surface can be removed by negative pressure alone, so that they do not later soil the actual process chamber or impede the joining process. Once the cleaning has been carried out, the structure is transferred to a process chamber, in which the joining process is carried out. Once the joining process has ended, the structure is transferred to a cooling chamber and cooled down there to a predetermined temperature. Once that predetermined cooling temperature has been reached, the structure is removed from the cooling chamber and taken away for further processing. At this point it should be noted that when the term "structure" is used herein, naturally it is also possible for the individual method steps to be carried out simultaneously with a number of structures.

Cleaning of the structure is carried out in a vacuum. This kind of procedure has the advantage of ensuring that by the reduction of the pressure in the cleaning chamber, some of the contaminants adhering to the process chamber evaporate quickly and detach possible further contaminants along with them, resulting in a surface of such a nature that it is well prepared for the later joining process.

Cleaning of the structure in a vacuum also has the advantage of ensuring that the process chamber adjoining the cleaning chamber need not again be evacuated entirely for every batch of structures introduced into the process chamber, since the process chamber communicates directly or indirectly through a gate with the cleaning chamber. The process chamber is adjoined by a cooling chamber, in which the structure is cooled down to a predetermined temperature. This kind of procedure can increase the throughput, since the various method steps are performed in succession, so that one batch is in the process chamber while the preceding batch is being treated in the cooling chamber and the next batch is being treated in the cleaning chamber. Nor does the process chamber come into contact with the ambient atmosphere, and therefore the process chamber does not have to be repeatedly evacuated. Moreover, no contaminants enter into the process chamber.

In accordance with another mode of the invention, the structure is heated in the cleaning chamber.

In accordance with a further mode of the invention, the cleaning chamber is heated to a temperature of approximately 200° C., for instance. This has the advantage on one hand that the cleaning process is speeded up, and on the other hand that the dwell time of the structure in the process chamber can be shortened, since now the structure no longer needs to be heated up from the ambient temperature to the joining temperature, but only from a higher temperature to the joining temperature.

In accordance with an added mode of the invention, the cleaning chamber is flushed with an inert gas. The inert gas may be technically pure argon.

In accordance with an additional mode of the invention, the flushing of the cleaning chamber can be carried out through the use of a heated inert gas. This has the advantage of causing the inert gas, upon passing through the structure, to heat the structure more evenly than would a heater disposed on the walls of the cleaning chamber.

In accordance with yet another mode of the invention, the cleaning chamber is operated at a negative pressure of between $10^{-3}$ and $10^{-6}$ bar and preferably approximately $10^{-5}$ bar.

The metallic joining or connection of the sheet-metal layers can be carried out with or without additives.

In accordance with yet a further mode of the invention, the joining of the individual sheet-metal layers can be carried out by brazing or sintering.

In accordance with yet an added mode of the invention, the brazing or sintering operation in the process chamber takes place at a temperature which is suitably adapted to the materials.

In accordance with yet an additional mode of the invention, the temperature in the process chamber is first raised to a first holding temperature and then held there for a certain period of time. As a result, a homogeneous distribution of temperature within the batch or within each structure is attained. Next, the temperature in the process chamber is raised up to a second holding temperature. The process chamber is kept at the second holding temperature for a certain period of time. The temperature in the process chamber is then raised up to a joining temperature above 1200° C. and kept there for a certain period of time.

In accordance with again another mode of the invention, the temperature in the process chamber is lowered after the joining operation. The lowering can be carried out by opening the process chamber over a large area toward the cooling chamber and/or the cleaning chamber. In that case, the process chamber gives up heat by radiation to the cooling and/or cleaning chamber. This can shorten the cooling process by about 15 minutes. At this temperature, the batch of structures is transferred from the process chamber to the cooling chamber. In the cooling chamber, the structures are cooled by the feeding-in of inert gas. An oxidation film forms on the structures simultaneously with the feeding-in of an inert gas.

In accordance with again a further mode of the invention, the structures are cooled in the cooling chamber to a temperature of approximately 150° C. and then are removed from the cooling chamber.

The determining process step, in terms of time, takes place in the process chamber. The dwell time of the batches in the antechamber or in the cooling chamber can be shorter than in the process chamber, so that the duration of the loading and unloading operations does not lengthen the cycle time of the entire operation.

With the objects of the invention in view, there is also provided an apparatus for metallically joining sheet-metal layers of a metal structure, especially a honeycomb body, to one another and/or to a metal housing, comprising a cleaning chamber; a process chamber to be connected to the cleaning chamber; a cooling chamber to be connected to the process chamber; and at least one negative pressure generator for generating a negative pressure in the process chamber, the cleaning chamber and the cooling chamber.

In accordance with a concomitant feature of the invention, there is provided at least one gate for connecting the process chamber to the cleaning chamber and/or to the cooling chamber for at least partially preserving a negative pressure relative to an outside atmosphere.

Other features which are considered as characteristic for the invention are set forth in the appended claims.

Although the invention is illustrated and described herein as embodied in a method for producing a metal structure and an apparatus for metallic joining of sheet-metal layers of a metal structure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
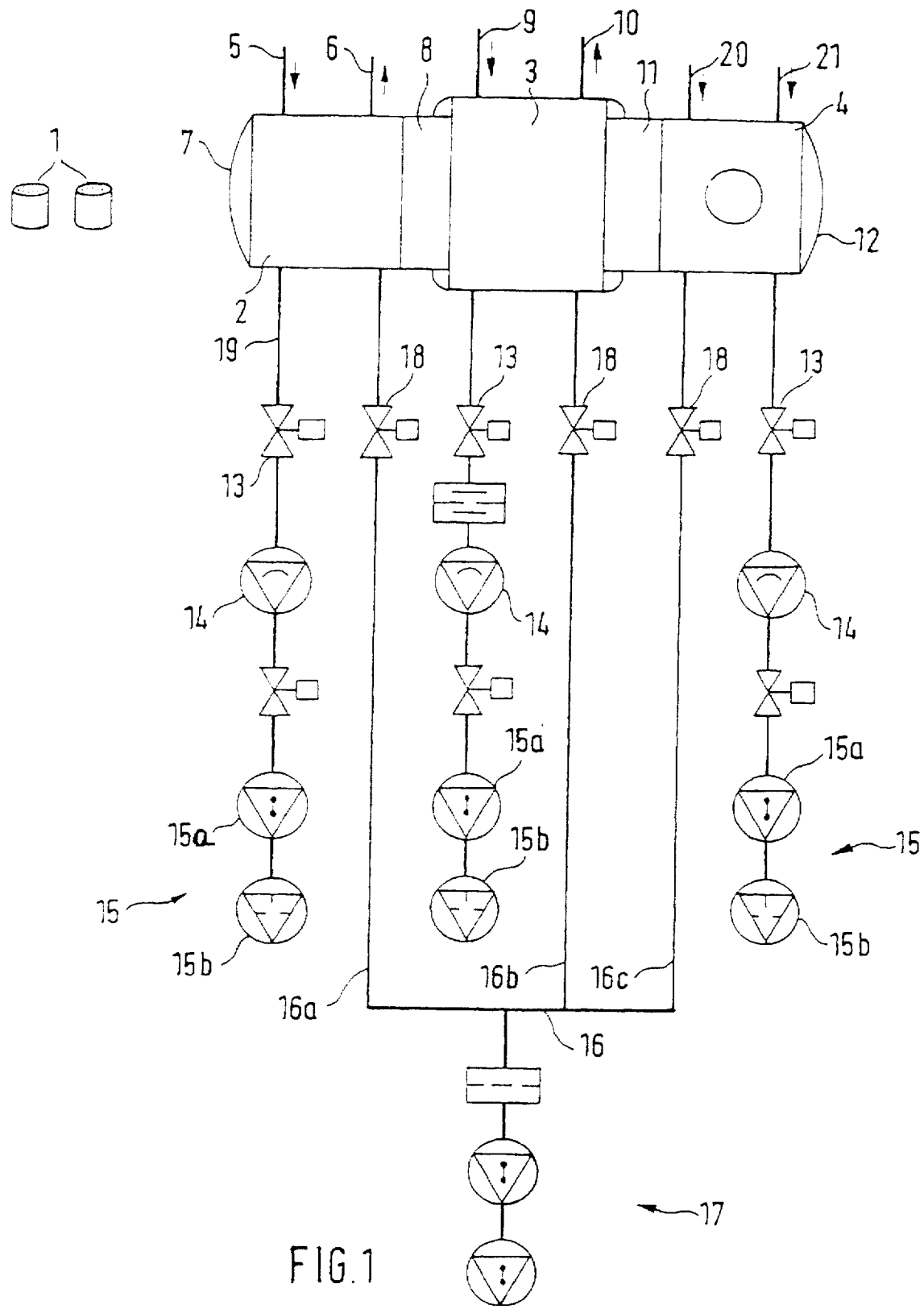
FIG. 1 is a diagrammatic and schematic view of an apparatus for performing the method of the invention.

Referring now to the figures of the drawings in detail and first, particularly, to FIG. 1 thereof, there is seen an apparatus for carrying out a method for producing a honeycomb body of a catalytic converter, which includes a cleaning chamber 2, a process chamber 3 and a cooling chamber 4. The cleaning chamber 2 has a cylindrical chamber housing, which is in the form of a double-walled jacket. A medium can be introduced through an inlet line 5 into an annular chamber between the double-walled jacket and can be removed through an outlet line 6. The medium may be water. The cleaning chamber may be cooled or heated through the use of this medium.

The cleaning chamber 2 has a charging door 7, which closes off the cleaning chamber 2 in a vacuum-tight fashion.

The cleaning chamber 2 communicates with the process chamber 3 through an intermediate door housing 8. A non-illustrated door, gate or sluice is disposed in the intermediate door housing 8 and divides the cleaning chamber 2 from the process chamber 3. The door may be constructed in the form of a slide. The door is sealed off in such a way that a vacuum loss to the environment can be averted.

An internal transport device is provided inside the cleaning chamber 2 in order to transport a batch of honeycomb bodies 1 disposed on a carrier from the cleaning chamber 2 into the process chamber 3. The honeycomb bodies 1 are metal structures having sheet-metal layers and a metal housing, as shown. The transport device may, for instance, be a three-armed loading fork, which is moved horizontally by an infinitely variable hydraulic drive. The carrier is formed of graphite with a ceramic coating. The individual honeycomb bodies are disposed on the carrier, standing on shaped parts that are likewise made of ceramic-coated graphite. Such a carrier is dimensionally stable and temperature-resistant. Moreover, because of the ceramic coating, no abrasion of the graphite occurs.

The door between the cleaning chamber 2 and the process chamber 3 can be raised and lowered hydropneumatically. A contact pressure mechanism that assures tightness is disposed toward the antechamber.

The process chamber 3 has interchangeable electrical heating elements, which are preferably disposed in a plurality of zones. The process chamber 3 has an internal chamber, which is surrounded by the housing of the process chamber 3. A coolant can be introduced between the internal chamber of the process chamber and the housing through an inflow line 9 and an outflow line 10, so that the process chamber 3 is cooled.

The cooling chamber 4 adjoins the process chamber 3, with an intermediate door housing 11 disposed between them. The cooling chamber 4 has a cylindrical housing, which is constructed with double walls and which is cooled or heated by a medium. The cooling chamber 4 can be sealed from the environment by a removal door 12. The removal door 12 is moved laterally through the use of an electric motor drive for opening and closing purposes.

In the intermediate door housing 11 is a non-illustrated intermediate door, gate or sluice, which can be raised and lowered through the use of a hydropneumatic drive, for example.

Each chamber has one device for generating a vacuum. This device includes a valve 13, a diffusion pump 14, and a pump set 15, which includes a fore-pump 15a and a Roots pump 15b.

In the embodiment shown, the cleaning chamber 2, the process chamber 3 and the cooling chamber 4 communicate through a pump line 16 with a vacuum pump set 17. One valve 18 is disposed in each line 16a, 16b and 16c. The pump set 17 serves to quickly pre-evacuate the chambers to the point of a starting pressure of the particular high-vacuum pump sets, as is carried out when large amounts of gas are removed by suction upon heating of the batch. The pump sets 15 and 17 define a negative pressure generator.

Measuring instruments that monitor the vacuum are not shown.

By way of example, loading and unloading of the apparatus may be carried out by a hoisting loading device. To that end, the charging door 7 is opened and a batch of honeycomb bodies 1 is introduced into the cleaning chamber 2. Next, the charging door 7 is closed. The door between the cleaning chamber 2 and the process chamber 3 and the door between the process chamber 3 and the cooling chamber 4 are closed. The valves 13 are closed. The valves 18 are opened, and a vacuum is built up in the chambers 2, 3 and 4 through the pump set 17. Once a prevacuum is reached in the chambers, the valves 18 are closed, and the valve 13, which is in a vacuum line 19 leading to the cleaning chamber 2, is opened. The high vacuum is generated in the antechamber 2 through the diffusion pump 14 and the pump set 15.

The batch of honeycomb bodies 1 remains in the cleaning chamber until the cleaning process has ended. Before the vacuum is built up, the cleaning chamber 2 can be flushed with an inert gas.

Once the cleaning process has been concluded, the door in the intermediate door housing 8 is opened, and the batch is transported from the cleaning chamber 2 to the process chamber 3 through the use of the internal transport device. The door in the intermediate housing 8 is closed. The valve in the vacuum line 19 is closed. The cleaning chamber 2 can then be charged again.

The temperature in the process chamber 3 is varied in accordance with the temperature control. The course of the temperature over time is shown in FIG. 2.

If the process chamber 3 has reached a joining temperature $T_v$, and if this temperature has been held over a time $H_v$, then the door in the intermediate housing 11 is opened, and the batch is carried into the cooling chamber 4 by an internal transport device. In the cooling chamber 4, a negative pressure has been generated that is essentially equivalent to the negative pressure in the process chamber. Once the charge has been removed from the process chamber, the door in the intermediate door housing 11 is closed. Coolant is fed through the double-walled housing of the cooling chamber 4 through respective coolant inflow and outflow lines 20 and 21, and the batch of honeycomb bodies 1 is cooled thereby.

Once an outlet temperature $T_A$ is reached, the removal door 12 of the cooling chamber 4 is opened, and the batch is removed from the chamber 4. In the mean time, the temperature of a brazing furnace has been cooled to an inlet temperature $T_E$. Once the batch has been removed, the cooling chamber 4 is closed and evacuated again.

Figure 2:
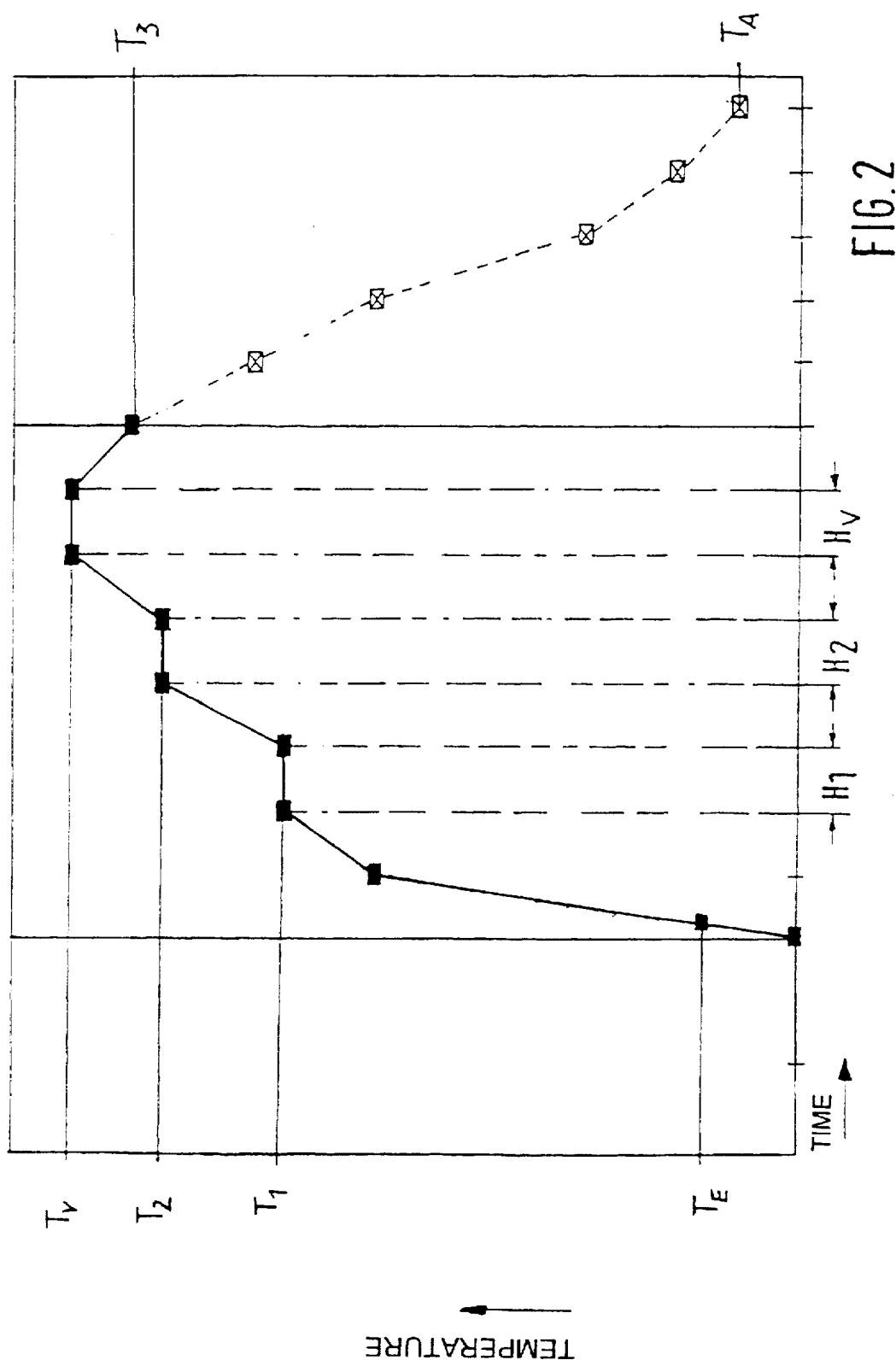
FIG. 2 is a graph showing a course of temperature over time in a vacuum brazing furnace.

FIG. 2 shows the course of the temperature over time in the process chamber and in the cooling chamber by way of example. The process chamber is heated to the temperature $T_E$. At this temperature, the batch from the antechamber is brought into the process chamber. The temperature in the process chamber is raised up to a first holding temperature $T_1$. The speed with which this temperature is reached depends on the heating power of the process chamber. The process chamber is held at the temperature $T_1$ for a period of time $H_1$. During this time, a homogenization of the temperature in the process chamber takes place. Next, the temperature in the process chamber is raised up to a second holding temperature $T_2$ and held at that temperature for a period of time $H_2$. Finally, the temperature in the process chamber is raised to the joining temperature, which may be above 1200° C. At this temperature $T_v$, the process chamber is operated for the period of time $H_v$. Once the time $H_v$ has elapsed, the heating of the process chamber is turned off, and the communication with the cooling chamber is opened. The temperature in the process chamber rapidly drops as a result to a temperature $T_3$. FIG. 2 shows the course of the temperature in the cooling chamber in dashed lines. The course of the temperature in the cooling chamber is not controlled. This is the result of the introduction of a protective gas and the circulation of the protective gas in the cooling chamber through the use of a fan. Once a temperature of approximately 150° C. has been reached in the cooling chamber, the batch can be removed.

I claim:

1. A method for producing a metal structure from at least partly structured, wound, intertwined or stacked sheet-metal layers, which comprises:

cleaning a structure having sheet-metal layers in a vacuum in a cleaning chamber;

transferring the structure to a process chamber;

carrying out a process for metallic joining of the sheet-metal layers in a vacuum;

transferring the structure to a cooling chamber; and cooling the structure to a predetermined temperature in a vacuum in the cooling chamber.

2. The method according to claim 1, which comprises carrying out the metallic joining process with additives.

3. The method according to claim 1, which comprises carrying out the metallic joining process without additives.

4. The method according to claim 1, which comprises configuring the sheet-metal layers into a honeycomb body.

5. The method according to claim 1, which comprises configuring the sheet-metal layers into a honeycomb body for a catalytic converter.

6. The method according to claim 1, which comprises heating the structure in the cleaning chamber.

7. The method according to claim 1, which comprises flushing the cleaning chamber with an inert gas.

8. The method according to claim 7, which comprises flushing the cleaning chamber with a heated inert gas.

9. The method according to claim 1, which comprises generating a negative pressure of between $10^{-3}$ and $10^{-6}$ bar in the cleaning chamber.

10. The method according to claim 1, which comprises generating a negative pressure of approximately $10^{-5}$ bar in the cleaning chamber.

11. The method according to claim 6, which comprises heating the cleaning chamber to a temperature of approximately 200° C.

12. The method according to claim 1, which comprises adapting the temperature in the process chamber to suit a predetermined temperature course.

13. The method according to claim 12, which comprises:

initially raising the temperature in the process chamber to a first holding temperature and maintaining the first holding temperature for a period of time;

subsequently raising the temperature to a second holding temperature and maintaining the second holding temperature for a period of time;

subsequently raising the temperature to a joining temperature and maintaining the joining temperature for a period of time; and subsequently lowering the temperature.

14. The method according to claim 13, which comprises lowering the temperature in the process chamber after the joining process partly by connecting the process chamber and the cooling chamber.

15. The method according to claim 13, which comprises cooling the structure in the cooling chamber to a temperature of approximately 150° C.

16. The method according to claim 1, which comprises introducing an inert gas into and removing the inert gas from the cooling chamber.

17. The method according to claim 1, which comprises effecting the metallic joining by brazing.

18. The method according to claim 1, which comprises effecting the metallic joining by sintering.

* * * * *